United States Patent [19]

Albaum et al.

[11] 4,339,451

[45] Jul. 13, 1982

[54] FLAVOR STABILIZED BEET COLORANT COMPOSITION

[75] Inventors: Joseph D. Albaum, Pleasantville, N.Y.; Ronald W. Ponzoni, Nutley, N.J.; Eric C. Johnson, Pleasantville, N.Y.

[73] Assignee: General Foods Corporation, White Plains, N.Y.

[21] Appl. No.: 191,569

[22] Filed: Sep. 29, 1980

[51] Int. Cl.³ ............................................. A23L 1/272
[52] U.S. Cl. .................................. 426/250; 426/540; 426/590; 426/655; 426/654
[58] Field of Search .............. 426/250, 540, 262, 270, 426/271, 654, 542, 655, 590

[56] References Cited

U.S. PATENT DOCUMENTS

| | | |
|---|---|---|
| 2,567,362 | 9/1951 | Berkman et al. .................... 426/540 |
| 2,799,588 | 7/1957 | Todd ................................... 426/540 |
| 3,336,141 | 8/1967 | Frisina ................................ 426/540 |
| 3,447,933 | 6/1969 | Smith et al. ........................ 426/540 |
| 4,027,042 | 5/1977 | Von Elbe ............................ 426/540 |
| 4,132,793 | 1/1979 | Haber et al. ....................... 426/540 |

Primary Examiner—Jeanette M. Hunter
Attorney, Agent, or Firm—Daniel J. Donovan; Thomas R. Savoie

[57] ABSTRACT

A red color extract from beets is stabilized against off flavor by co-drying with a polyvalent metal salt, such as calcium chloride.

26 Claims, No Drawings

FLAVOR STABILIZED BEET COLORANT COMPOSITION

BACKGROUND OF THE INVENTION

1. Field of the Invention

This invention relates to food colorants. More particularly, it relates to a red colorant obtained from beets. This invention especially relates to a stabilized beet colorant composition.

2. Description of the Prior Art

Among the food colorants that are approved by the United States Food and Drug Administration as permanently listed and exempt from certification is a red colorant of dehydrated beets (beet powder).

U.S. Pat. No. 3,336,141 of Frisina discloses a coloring emulsion prepared from naturally-occurring organic materials such as paprika, annatto, beets, carrots, sweet potatoes, tomatoes, saffron and blueberries. The emulsion is prepared by (a) combining a solution of an edible organic solvent and an oleoresin of a naturally-occurring organic material which contains coloring matter with a solution of water and a chelating agent; (b) adding to this mixture finely ground particles of the naturally-occurring organic material; and (c) shearing the resultant mixture to reduce the finely ground material and the oleoresin to colloidal size so as to produce an emulsion.

U.S. Pat. No. 2,567,362 of Berkman et al. and U.S. Pat. No. 2,799,588 of Todd teach processes for extracting pigments from vegetables. Beets are not specifically disclosed as a useful starting material for either process, however.

U.S. Pat. No. 3,447,933 of Smith et al relates to a spray-drying process for preparing a food colorant in the form of dry, free-flowing particles from an aqueous slurry of the colorant.

U.S. Pat. No. 4,027,042 of Von Elbe et al. relates to recovering the pigment from beets in concentrated form. The beets are pulped to produce an insoluble phase (the pulp) and a soluble phase containing the beet pigment, protein and carbohydrates (principally sucrose). The soluble phase is subjected to fermentation wherein the carbohydrates, nitrates, nitrites and some of the proteins are utilized as the food source. This effects a concentration of the beet pigment without destroying the pigment or causing any undesirable effect on the pigment from the standpoint of physical characteristics and color.

U.S. Pat. No. 4,132,793 of Haber et al. relates to stabilizing the color of red beet dye to heat and light by admixing with the beet dye ascorbic or erythorbic acid or a sodium salt thereof plus a sodium phosphate and, optionally, ethylenediaminetetracetic acid or a sodium and/or a calcium salt thereof. This patent also discloses that certain cations and anions should be avoided with liquid beet concentrate. Cationic salts, which are said to show the most degradation in terms of color stability, are di- and polyvalent salts of $Fe^{++}$, $Ca^{++}$, $Al^{+++}$, $Mg^{++}$ and $Cu^{++}$. Among the anions, sulfates are said to have no effect whereas sulfites and carbonates are said to have a negative effect. Similar effects were observed with known preservatives containing these anions while propionic acid was disclosed as producing some negative effects. Further, the Haber et al. patent does not disclose that beet colorant may develop an off flavor. Consequently, this patent does not suggest the use of polyvalent cations at concentrations used herein for any purpose, much less that the off flavor can be stabilized or that the additives disclosed therein or other compounds might be effective in stabilizing the flavor, as opposed to the color, of beet colorant.

With time, beets, beet pigment and beet pigment extract develop undesirable flavors and odors as well as discoloration. This limits the use of beet color and causes serious problems when the beet colorant or food products containing it must be stored for prolonged periods.

It is an object of this invention to provide a red food colorant which remains stable as to flavor for prolonged periods of time.

It is another object of this invention to provide a flavor-stable beet pigment composition useful as a food colorant.

It is still another object of this invention to provide a dry food colorant derived from beets which maintains its flavor when stored per se or when admixed with food products.

SUMMARY OF THE INVENTION

In accordance with the present invention, it has been found that metal ions will stabilize the flavor of beet pigment in food compositions. More particularly, this invention is directed to a codried food color composition comprising (a) beet and (b) a flavor-stabilizing amount of a food-acceptable polyvalent metal salt.

This invention is also directed to a method of preparing a flavor-stabilized beet pigment composition in dry form which comprises (a) admixing an aqueous solution comprising beet pigment with a flavor-stabilizing amount of a source of a food-acceptable polyvalent metal salt; and (b) removing water from the admixture of step (a) to produce a dry powder of a flavor-stabilized beet pigment composition.

This invention is further directed to the flavor-stabilized beet pigment composition prepared by the above-described method.

In one embodiment, this invention is directed to a food composition containing the above-described co-dried food color composition.

In another embodiment, this invention is directed to a dry beverage mix containing the above-described co-dried food color composition.

In further embodiments, the invention is directed to employing either an inorganic salt or an organic salt as the food acceptable polyvalent metal salt in the above-described co-dried food color compositions, and method of preparation.

DESCRIPTION OF THE PREFERRED EMBODIMENTS

The present invention relates to a flavor-stabilized food colorant derived from beets. This colorant, which is also described herein as a pigment, is provided in a dry and flavor-stabilized form by incorporating a source of a food-acceptable metal ion with a liquid beet extract composition prior to drying the liquid so as to produce the beet colorant in dry particulate form.

Beet colorant and beet color extract currently available have certain inherent disadvantages when utilized in dry particulate form. When this dry powder is stored or added to dry food preparations or dry beverage mixes, the red color, with time, may discolor and fade when made up in liquid form. In addition, an off flavor is also developed when red beet colorant is stored in dry form on storage.

It has been observed that the cause of this gradual increase in off flavors can be attributed to the concentration of dimethyl sulfide in the beet colorant which gradually increases with time. It has further been observed that one of the natural components of the beet colorant composition, S-methyl methionine, is the precursor of dimethyl sulfide. S-methyl methionine decomposes slowly at room temperature and more rapidly upon heating to produce dimethyl sulfide (DMS). Preventing the decomposition of S-methyl methionine was, therefore, considered as a means of stabilizing the flavor of the red colorant composition obtained from beets.

It has been discovered, and this is the essence of the present invention, that a source of a food-acceptable polyvalent metal ion will stabilize the beet colorant composition so as to substantially reduce the tendency of the composition to develop an off flavor. The mechanism by which the metal ion accomplishes this stabilization is not now presently understood but it is thought that the high cationic strength provided by the metal ion source to the liquid beet extract concentrate prior to its being dried contributes significantly to the mechanism of stabilizing the S-methyl methionine. In some instances, the stabilization of the off flavor may be accompanied by the red color exhibiting less tendency to fade.

In practicing the present invention, wide latitude can be observed in selecting the source of the polyvalent metal ion. However, certain guidelines and specific examples will facilitate the selection by those skilled in the art. Initially, but of critical and yet obvious importance, the source of the metal ion must be one that is food acceptable, i.e., it must be inherently safe for human consumption. Further, the source of the metal ion will be a polyvalent metal salt. Metal inorganic salts are preferred although some metal organic salts can be utilized. The inorganic salts are easier to handle, lower in cost and more effective at a given concentration. Further, the nature of the cation is important. Polyvalent metal salts are preferred to monovalent metal salts because they provide a higher ionic strength to the beet extract solution. Thus, a 50% concentration of sodium chloride (based on the combined weight of the additive and the beet solids) is not as effective as a 10% concentration of calcium chloride. The useful cations include such food-acceptable polyvalent metal ions as calcium, magnesium, aluminum and iron with calcium being preferred. The cation may be provided from a single source or from multiple sources. In addition, the cation may be a single polyvalent metal ion or a mixture of the useful polyvalent metal ions.

Regarding the anions, it is preferred they be inorganic although some organic anions can be used, provided they form, together with the polyvalent metal ion, a food-acceptable compound. Further, the anion must be inert since its role in stabilizing the flavor of the beet colorant is not entirely clear. As used herein, the anion is inert in the sense that it does not prevent the stabilization of the beet colorant flavor resulting from the use of the polyvalent metal ion. However, in some instances, the inert anion may not be totally without effect but may enhance or detract to an insignificant degree from the flavor stabilization of the polyvalent metal ion. Monovalent anions are preferred to polyvalent anions since the polyvalent anions are too competitive with the S-methyl methionine for the cations. Preferred inorganic anions include chloride, nitrate and phosphate. Other anions, such as acid carbonate and acid sulfate, may be used but are not preferred. Among the organic anions the acetate, ascorbate and propionate anion are preferred. Such anions as citrate, lactate and tartrate are less preferred.

Therefore, such inorganic salts as calcium chloride, tricalcium phosphate, aluminum nitrate and ferric chloride are particularly useful. Useful organic salts include calcium acetate, calcium ascorbate and calcium propionate. Further, mixtures of salts, all inorganic, all organic or both inorganic and organic, may be usefully employed in this invention. Those skilled in the art can select other useful sources of polyvalent metal ions from the above guidelines and directives. Several screening tests may be utilized to select the most appropriate one for a given situation.

Since the science of chemistry does not permit predictions with unerring accuracy, those skilled in the art will appreciate that not all combinations of a polyvalent metal cation and a monovalent anion will be equally useful or produce the same results in the present invention. Thus, a compound of a particular polyvalent metal cation and a particular monovalent anion may result in inferior results to those one might expect. Similarly, not all combination of the less-preferred monovalent metal cations and polyvalent anions will function in the same fashion. Most will be, as expected, inferior to the stabilizing effect of preferred compounds while individual ones may be equal to or superior to a particular combination of polyvalent metal cation and monovalent anion in this regard.

To obtain effective stabilization of the beet colorant, the source of metal ion should be added to the liquid beet extract before the water is removed to provide the colorant in a dry, particulate form. Dry mixing the source of metal ion with the dry beet pigment composition will not produce the desired stabilization.

The quantity of the polyvalent metal ion source to be added should be an amount sufficient to stabilize the flavor of the beet colorant. A flavor stabilizing amount as used herein is an amount sufficient to prevent the production of noticeable amounts of dimethyl sulfide in the beet colorant composition described herein. Basing the metal compound addition on the amount of solids in the liquid beet extract concentrate as it is prepared for drying is an effective means of providing the desired amount. The effective amount of the polyvalent metal compound may most conveniently be expressed as a weight percent of the metal ion (based on the combined weight of the polyvalent metal compound, other additives and the beet solids). Thus, with an inorganic salt, a range of 1.0 to 30%, preferably 20%, most preferably 2–10 calcium ion has been found useful. With an organic salt, a range of 1 to 30%, preferably 5–25% calcium is usefully employed. It is not known why a higher concentration of an organic salt is required. It may be that the higher degree of dissociation of the polyvalent metal ions in the inorganic salts may be the reason for this difference in useful ranges. Appropriate calculations, based on these metal ion contents, will provide the useful concentration ranges on the basis of total polyvalent metal salt for the particular salt selected for use. With a compound such as $CaCl_2$, concentrations in the upper portion of the useful range can cause caking of the dried powder colorant in some end uses. Where other useful compounds cause caking and other problems, simple screening tests will permit selection of appropriate concentrations to provide effective flavor stabilization while minimizing the caking or other problems.

In practicing this invention, the beet color is utilized in liquid form as a beet extract having a concentration of 2°-80° Brix. This may be provided by any of several means. Liquid beet extract concentrate may be obtained commercially. One of these is available under the tradename COLOR-TREME R-111. This is an extract of beet root made by Beatrice Foods Company and has a concentration 68° Brix. Alternately, a liquid beet extract can be obtained by preparing it, for example, from whole beets by well known means. Briefly, in one such procedure, the beets are reduced to a pulp using conventional equipment such as a grinder, homogenizer, high speed disintegrator, rotary knife cutter and the like. The liquid produced thereby consists of about 10% solids. Some of the pulp can be removed by liquid-solid techniques such as filtration, centrifugation, decantation and the like. In addition, or alternatively, the liquid extract can be concentrated by removal of water, although care must be taken to protect the heat-sensitive materials in the extract. Concentration means, such as low temperature evaporation, vacuum distillation and the like, may be employed. The concentrate produced can have a concentration of 2°-80° Brix. Solids content may range from 5-90%.

The source of metal ion should be added to the beet colorant while it is in liquid form. It may be incorporated therein by adding it to the liquid extract. Agitation may be required to effect dilution or dispersion and may be required to provide a uniform liquid mixture to the drying processes.

The mixture of beet extract and metal ion source may be dried by conventional means to provide the stabilized colorant in the form of a dry powder. The process of removing water from the mixture is referred to herein as "co-drying" and the product as being "co-dried." Such well known procedures as spray drying, drum drying or freeze drying may be conventionally utilized to effect the water removal and produce the dry powder. Those skilled in the art who are familiar with these procedures will appreciate that because of the temperature-sensitive nature of the beet colorant, care should be utilized if spray drying is employed. It has been found that spray drying temperatures of about 160°-650° F. inlet and 140°-220° F. outlet have proven satisfactory with about 335°-395° F. inlet and 155°-215° F. outlet being most preferred.

In practicing this invention to provide a stabilized red colorant, the liquid beet extract may be employed as prepared or as obtained without further processing except, perhaps, for solids separation and concentration. A fermentation process, such as that disclosed in U.S. Pat. No. 4,027,042, may be employed, if desired, to remove carbohydrates, nitrates, nitrites and protein from the liquid beet extract and may be practiced in conjunction with the present invention. Such use is optional since the present invention will stabilize the beet colorant whether or not the liquid extract has been subjected to fermentation. Where a fermentation step is employed, the source of metal ion would preferably be added to the liquid extract subsequent to the fermentation operation and prior to the water removal step.

The stabilized beet colorant of this invention may be employed in a variety of uses. It can be used as such, that is it can be provided as a dry powder colorant for home or commercial use as a food-acceptable colorant. It can also be incorporated into dry beverage mixes where red is the desired color of the liquid beverage to be prepared therefrom. This stabilized red colorant also may find use in prepared foods where color is often a factor in providing a consumer-acceptable product.

A typical example of a formulation for a powdered soft drink employing the beet color of the invention is:

| Sugar | 90-95% |
|---|---|
| Food Acid | 1-7% |
| Buffer | 1-3% |
| Beet Color | 0.1-5% |
| Flavor | 0.01-5% |

The terms "beet colorant," "beet pigment,+ and "beet colorant composition" have been used interchangeably throughout this specification to indicate the same material, namely the red color material obtained from beets.

Unless specifically expressed to the contrary, all percentages herein are by weight and all temperatures herein are degrees Fahrenheit.

The following examples will serve to illustrate the subject invention.

EXAMPLE I

Several common fixatives or carriers were evaluated with a beet extract concentrate.

In each instance, the fixative or carrier being tested was added to a liquid beet extract concentrate to produce a 50/50 solids ratio of fixative to beet solids. The beet extract (COLOR-TREME R-111, 68° Brix, 1977 production) was a commercially-available product obtained from Color-Treme Company, a division of Beatrice Foods Company, Beloit, Wis. The fixatives evaluated were a maltodextrin, available under the tradename Frodex 10DE from American Maize-Products Company; a modified corn starch available under the tradename Capsul and gum arabic.

In each run, the beet extract plus fixative was spray dried at a 200° F. inlet and 150° F. outlet temperature. The feed solids to the tower were 30% total. The dried powder from each run was stored in paper-polyethylene-aluminum-polyethylene sealed pouches at 90° F. and 85% relative humidity for twelve weeks. The presence of dimethyl sulfide (DMS) in the samples was determined by gas chromatography. DMS content was utilized as a measure of the stability of the beet pigment. The results are presented below. The data for DMS content are reported in parts per million, calculated on beet solids basis.

| | DMS, ppm | | |
|---|---|---|---|
| | 2 weeks | 4 weeks | 12 weeks |
| Frodex 10DE | 12 | 9 | 44 |
| Capsul | 8 | 10 | 42 |
| Gum Arabic | 7 | 12 | 43 |

None of the common fixatives tested was effective in retarding DMS evolution.

The lack of protection illustrated above for common carriers is similar to that of dried beet per se. For example, a 40% solution of beet solids (100% beet) spray dried at 210° F. inlet and 150° F. outlet, resulted in DMS contents of 9, 24 and 36 ppm after 4, 8 and 12 weeks storage as specified above.

EXAMPLE II

Two storage stability runs were made as in Example I to compare tricalcium phosphate with Frodex 10DE. Both were present at the 50/50 level and were spray dried as in Example I except that the feed solids to the tower were 8% rather than 30%. The storage test results were:

|  | DMS, ppm | | |
|---|---|---|---|
|  | 2 weeks | 4 weeks | 12 weeks |
| Frodex 10DE | 29 | 35 | 47 |
| TCP | 2 | 1 | 1 |

Tricalcium phosphate prevented DMS evolution to a significant degree.

EXAMPLE III

The procedure of Example II was repeated with the total solids to the drying tower at 30%. The storage stability was evaluated in an accelerated test developed to predict DMS evolution over twelve weeks storage at 90°/85% RH as in Example I. The test consists of placing the sample in an oven at 95° C. for one hour and sampling every 15 minutes. These samples were analyzed for DMS and compared.

|  | DMS, ppm | | | | |
|---|---|---|---|---|---|
|  | 0 Min. | 15 Min. | 30 Min. | 45 Min. | 60 Min. |
| 50% Beet and 50% Frodex 10DE | 2 | 11 | 27 | 48 | 64 |
| 50% Beet and 50% TCP | 3 | 7 | 4 | 2 | 1 |

The effect of TCP was independent of feed solids at the levels evaluated.

EXAMPLE IV

Several divalent and monovalent salts were evaluated in the fashion of Example I. All samples were spray dried under the same conditions, 220° F. inlet and 160° F. outlet, 30% feed solids at 50% beet, 50% additive fix level. The storage stability of these materials was evaluated in the accelerated test and the twelve-week test. The test data for TCP from the above examples are included in the tabulated results below.

| 1 Hour Test | | | | | |
|---|---|---|---|---|---|
|  | DMS, ppm | | | | |
|  | 0 Min. | 15 Min. | 30 Min. | 45 Min. | 60 Min. |
| Frodex Carrier | 2 | 16 | 45 | 71 | 76 |
| NaCl Carrier | 0.3 | 7 | 13 | 17 | 18 |
| KCl Carrier | — | 8 | 13 | 14 | 16 |
| Monocalcium Phosphate (MCP) | 0.3 | 1 | 5 | 7 | 10 |
| $CaCl_2$ Carrier | 0.1 | 0.3 | 0.6 | 0.8 | 2 |
| $MgCl_2$ Carrier | 0.1 | 0.1 | 0.3 | 0.3 | 0.4 |
| TCP Carrier | 3 | 7 | 4 | 2 | 1 |

| 12 Weeks Test | | | |
|---|---|---|---|
|  | DMS, ppm | | |
|  | 4 Weeks | 8 Weeks | 12 Weeks |
| Frodex | 9 | 27 | 33 |
| NaCl | 2 | 1 | 4 |
| KCl | Not stored at these conditions | | |
| MCP | 0.2 | 0.1 | 0.3 |
| $CaCl_2$ | 0.1 | 0.2 | 0.2 |
| $MgCl_2$ | Not stored at these conditions | | |
| TCP | 2 | 1 | 1 |

These data show that salts other than TCP were effective in slowing DMS evolution.

EXAMPLE V

Additional runs were made with $CaCl_2$ in the fashion of Example I to determine the effect of concentration. These runs were all made of 50% carrier to 50% beet solids. $CaCl_2$ was added at 5% of total solids, 10%, 20% and 50%. The difference was made up with Frodex 10DE. All were spray dried at 220° F. inlet and 150° F. outlet with 30% feed solids to the tower.

|  | pH | 0 Min | 15 Min | 30 Min | 45 Min | 60 Min |
|---|---|---|---|---|---|---|
| 45% Frodex, 5% $CaCl_2$ | 4.3 | 0.2 | 14 | 22 | 33 | 63 |
| 40% Frodex, 10% $CaCl_2$ | 4.2 | 0.2 | 5 | 11 | 21 | 27 |
| 30% Frodex, 20% $CaCl_2$ | 4.0 | 0.1 | 1 | 3 | 5 | 7 |
| 50% $CaCl_2$ |  | 0.1 | 0.3 | 0.6 | 0.8 | 2 |

These data show that DMS evolution was inversely related to the quantity of cation available.

EXAMPLE VI

The effect of pH was evaluated in another series of runs performed in the fashion of Example I. The pH was adjusted with $H_3PO_4$ or NaOH. The Frodex control had an unadjusted pH of 4.5.

| Sample |  | DMS, ppm | | | | |
|---|---|---|---|---|---|---|
|  |  | 0 Min | 15 Min | 30 Min | 45 Min | 60 Min |
| 1 | 50% Beet in: 50% Frodex Carrier pH 2.0 | 0.1 | 14 | 23 | 40 | 48 |
| 2 | 50% Frodex Carrier pH 3.4 | 0.2 | 13 | 31 | 49 | 57 |
| 3 | 50% Frodex Carrier pH 4.5 | 2 | 11 | 27 | 48 | 64 |
| 4 | 50% Frodex Carrier pH 6.0 | 3 | 46 | 80 | 82 | 83 |
| 5 | 50% Frodex Carrier pH 8.0 | — | 49 | 74 | 73 | 94 |
| 6 | 20% $CaCl_2$, 30% Frodex pH 4.0 | 0.1 | 1 | 3 | 5 | 7 |
| 7 | 50% $CaCl_2$ pH 3.8 | 0.1 | 0.3 | 0.6 | 0.8 | 2 |
| 8 | 50% TCP pH 5.9 | 2 | 8 | 4 | 2 | 1 |
| 9 | 40% TCP, 10% $CaCl_2$ pH 4.6 | 0.2 | 2 | 4 | 4 | 5 |

Adjusting pH per se was not significant in retarding DMS evolution as is evident from samples 1 through 5, but the use of polyvalent metal salts has a significant effect, as samples 6 through 9 demonstrate.

EXAMPLE VII

Freeze drying was substituted for spray drying for three samples. One was a control using Frodex 10DE carrier, the second using CaCl$_2$ and the third using TCP. All at 50% fix level.

|  | DMS, ppm | | | | |
|---|---|---|---|---|---|
|  | 0 Min | 15 Min | 30 Min | 45 Min | 60 Min |
| Control | 0.2 | 21 | 44 | 47 | 50 |
| CaCl$_2$ | 0.4 | 0.2 | 0.2 | 0.2 | 0.3 |
| TCP | 0.2 | 7 | 14 | 14 | 13 |

From these data it would appear that the relative effectiveness of a material on DMS evolution is independent of the drying procedure employed.

EXAMPLE VIII

The effectiveness of dry blending materials with spray dried beet solids was evaluated. The beet extract concentrate of Example I was spray dried in accordance with that example. It was then blended with the dry materials under test. The ratio used is set forth below. The samples were stored at 90° F. and 85% relative humidity as in Example I and analyzed for dimethyl sulfide at four-week intervals. In addition, these blends were evaluated in the one-hour test.

The results are presented below.

|  | DMS, ppm | | |
|---|---|---|---|
|  | 4 Weeks | 8 Weeks | 12 Weeks |
| Spray Dried 50% Beet in 50% Frodex Control | 9 | 24 | 30 |
| 33% TCP, 78% Control | 8 | 10 | 23 |
| 50% TCP, 50% Control | 8 | 7 | 18 |

|  | 0 Min | 15 Min | 30 Min | 45 Min | 60 Min |
|---|---|---|---|---|---|
| Spray dried 50% Beet, 50% Frodex Control | 1 | 15 | 32 | 55 | 68 |
| 33% TCP, 67% Control | 2 | 10 | 29 | 45 | 67 |
| 50% TCP, 50% Control | 2 | 21 | 53 | 71 | 94 |

These runs demonstrate dry mixing of the carrier and dry beet was not effective in stabilizing DMS evolution.

EXAMPLE IX

Several additional salts were tested by the procedure of Example I except that the one-hour accelerated test was employed.

|  | pH | DMS, ppm | | | | |
|---|---|---|---|---|---|---|
|  |  | 0 Min | 15 Min | 30 Min | 45 Min | 60 Min |
| Na$_2$HPO$_4$ | 8.0 | — | 68 | 62 | 42 | 24 |
| NaH$_2$PO$_4$ | 4.2 | 0.2 | 3 | 18 | 42 | 45 |
| Calcium Citrate | — | 0.6 | 14 | 37 | 53 | 89 |
| Trisodium Citrate | — | 2 | 27 | 104 | 129 | 94 |

Obviously, these materials were not as effective in controlling DMS evolution as some of the other materials evaluated in these examples. However, some effect on the DMS evolution was realized with these materials.

EXAMPLE X

Two production size runs were made on a production spray tower. The batch formulations were as follows:

|  | Batch Formulation | | | |
|---|---|---|---|---|
|  | % Beet | % CaCl$_2$ | % Frodex | % TCP |
| Batch No. 1 | 52 | 17 | 31 | — |
| Batch No. 2 | 52 | 17 | — | 31 |

The batches were prepared as follows:

Batch No. 1

99 gallons of water were added to a mixing tank. With the agitator running, 120 pounds of Frodex 10DE were added and the contents of the tank was mixed for about 20 minutes until the malto-dextrin was completely dissolved. 88 pounds of CaCl$_2$.2H$_2$O were added and mixed until dissolved. Finally, 294 pounds of liquid beet extract concentrate (Color-Treme R-111, 68° Brix, 1977 production) were added and mixed for about 10 minutes prior to spray drying.

Batch No. 2

99 gallons of water were added to the mixing tank. With the agitator running, 88 pounds of CaCl$_2$.2H$_2$O were added and mixed until dissolved. 120 pounds of tricalcium phosphate were then added. When this was dispersed, 294 pounds of the above liquid beet extract concentrate were added. The mixture was continuously mixed during spray drying to prevent the tricalcium phosphate from settling out.

Each batch was spray dried in the production spray tower under the following conditions:

| Inlet | 360°–370° F. |
|---|---|
| Outlet | 185° F. |
| Nozzles | 8 nozzles, size 74/421 (Spraying Systems Company, Wheaton, Illinois) |
| Rate | 450#s/hour |

The product from each batch was evaluated in the one-hour accelerated test with the following results:

| Moisture | 0 Min | 15 Min | 30 Min | 45 Min | 60 Min |
|---|---|---|---|---|---|
| 7.6 | 0.1 | 1 | 2 | 4 | 5 |
| 5.6 | 0.1 | 1 | 2 | 2 | 3 |

These examples show that drying a liquid beet extract with a divalent cation was very effective in retarding dimethyl sulfide (DMS) evolution.

EXAMPLE XI

The effectiveness of a number of calcium organic salts was evaluated in the fashion of Example I but utilizing the accelerated test of Example III. All samples were spray dried under the same conditions, 230° F. inlet and 195° F. outlet and 30% feed solids. The test data are presented in the tabulated results below.

| Sample | DMS, ppm | | | | | % Ca++ |
|---|---|---|---|---|---|---|
|  | 0 Min | 15 Min | 30 Min | 45 Min | 60 Min |  |
| #1 50% Beet, 50% Frodex Control | 0.8 | 30 | 62 | 81 | 109 | 0 |
| #3 52% Beet, 31% Frodex, 17% Calcium Lactate | 4 | 39 | 79 | 100 | 127 | 6% |
| #4 50% Beet, 50% Calcium Lactate | 5 | 40 | Discontinued | | | 8% |

-continued

| Sample | DMS, ppm 0 Min | 15 Min | 30 Min | 45 Min | 60 Min | % Ca++ |
|---|---|---|---|---|---|---|
| #5 33% Beet, 67% Calcium Ascorbate | 0.3 | 4 | 9 | 13 | 20 | 5% |
| #6 50% Beet, 31% Frodex, 17% Calcium Propionate | 7 | 60 | 68 | 77 | 79 | 4% |
| #7A 50% Beet, 50% Calcium Propionate | 3 | 12 | 10 | 9 | 4 | 11% |
| #7B 50% Beet, 50% Calcium Propionate | 2 | 8 | 9 | 5 | 4 | 11% |
| #8 50% Beet, 50% Calcium Acetate | 15 | 37 | Discontinued | | | 13% |
| #9 33% Beet, 67% Calcium Acetate | 7 | 13 | 36 | 60 | 51 | 17% |
| #10 33% Beet, 67% Calcium Lactate | 2 | 25 | 48 | 90 | 119 | 12% |

Calcium ascorbate and calcium propionate are effective in limiting DMS evolution while calcium lactate and calcium acetate are not as effective.

EXAMPLE XII

The effectiveness of a number of calcium chloride concentration was evaluated in the fashion of Example I but utilizing the accelerated test of Example III. All samples were spray dried under the same conditions, 230° F. inlet and 195° F. outlet and 30% feed solids. The test data are presented in the tabulated results below.

| Sample | DMS, ppm 0 Min | 15 Min | 30 Min | 45 Min | 60 Min | % Ca++ |
|---|---|---|---|---|---|---|
| #2 52% Beet, 31% Frodex, 17% $CaCl_2$ | 0.2 | 3 | 5 | 5 | 9 | 6% |
| #11 50% Beet, 8.5% $CaCl_2$, 41.5% Frodex | 0.2 | 2 | 7 | 10 | 13 | 3% |
| #12 50% Beet, 4% $CaCl_2$, 46% Frodex | 2 | 15 | 20 | 32 | 49 | 1.4% |
| #13 50% Beet, 2% $CaCl_2$, 48% Frodex | 3 | 24 | 43 | 80 | 114 | 0.7% |
| #14 96% Beet, 4% $CaCl_2$ | 1 | 7 | 13 | 17 | 28 | 1.4% |

The several tests in Examples XI and XII with calcium propionate and calcium chloride at various calcium concentrations show that higher concentrations provide more effective control and that at comparable calcium levels the inorganic salt was more effective than the organic salt.

What is claimed is:

1. A co-dried food color composition comprising:
   (a) beet extract; and
   (b) a flavor-stabilizing amount of a food-acceptable polyvalent metal salt, wherein the weight percent of the polyvalent metal ion; based on the weight of the dry composition is from 1% to 30%.
2. A food color composition in accordance with claim 1 wherein the polyvalent metal is calcium, magnesium, aluminum or iron.
3. A food color composition in accordance with claim 1 wherein the metal is divalent.
4. A food color composition in accordance with claim 3 wherein the metal is calcium.
5. A food color composition in accordance with claim 4 wherein the salt anion is an inert monovalent anion.
6. A food composition containing the co-dried food color composition of claim 1.
7. A dry beverage mix containing the co-dried food color composition of claim 1.
8. A food color composition in accordance with claim 1 wherein the salt is calcium chloride and the flavor-stabilizing range of 1–30% calcium ion is based on the combined weight of calcium chloride, any other additives and beet solids.
9. A food color composition in accordance with claim 21 wherein the flavor-stabilizing amount is in the range of 2–10% calcium.
10. A method of preparing a flavor-stabilized beet extract composition in dry form which comprises:
    (a) admixing an aqueous solution comprising beet extract with a flavor-stabilizing amount of a food acceptable polyvalent metal salt, wherein the weight percent of the polyvalent metal ion; based on the weight of the dry composition is from 1% to 30%; and
    (b) removing water from the admixture of step (a) to produce a dry powder of a flavor-stabilized beet extract composition.
11. A method according to claim 10 wherein the polyvalent metal is calcium, magnesium, aluminum or iron.
12. A method according to claim 11 wherein the polyvalent metal is calcium.
13. A method according to claim 10 wherein the salt anion is an inert monovalent anion.
14. A method of preparing a flavor-stabilized beet extract composition in dry form which comprises:
    (a) admixing an aqueous solution comprising beet extract with a flavor-stabilizing amount of a food-acceptable inorganic salt of a polyvalent metal, wherein the weight percent of the polyvalent metal ion; based on the weight of the dry composition is from 1% to 30%; and
    (b) removing water from the admixture of step (a) to produce a dry powder of a flavor-stabilized beet extract composition.
15. A method according to claim 14 wherein the water is removed in step (b) by spray drying.
16. A method according to claim 14 wherein the water is removed in step (b) by freeze drying.
17. A method according to claim 14 wherein the polyvalent metal is calcium, magnesium, aluminum or iron.
18. A method according to claim 14 wherein the metal is a divalent metal.
19. A method according to claim 27 wherein the metal is calcium.
20. A method according to claim 14 wherein the inorganic salt is a metal salt of an inert inorganic anion.
21. A method according to claim 20 wherein the inert anion is monovalent.
22. A method according to claim 21 wherein the anion is chloride, nitrate or phosphate.
23. A method according to claim 20 wherein the metal salt is calcium chloride.
24. A method according to claim 23 wherein the flavor-stabilizing amount is in the range of 2–10% calcium.
25. A powdered soft drink mix composition containing from 0.1% to 5% by weight of a co-dried color composition which comprises beet extract and a flavor stabilizing amount of calcium chloride, wherein the weight percent of calcium based on the weight of the co-dried color composition is from 1% to 30%.
26. A food composition in accordance with claim 25 wherein the flavor-stabilizing amount is in the range of 2–20% calcium.

* * * * *